Nov. 30, 1926.

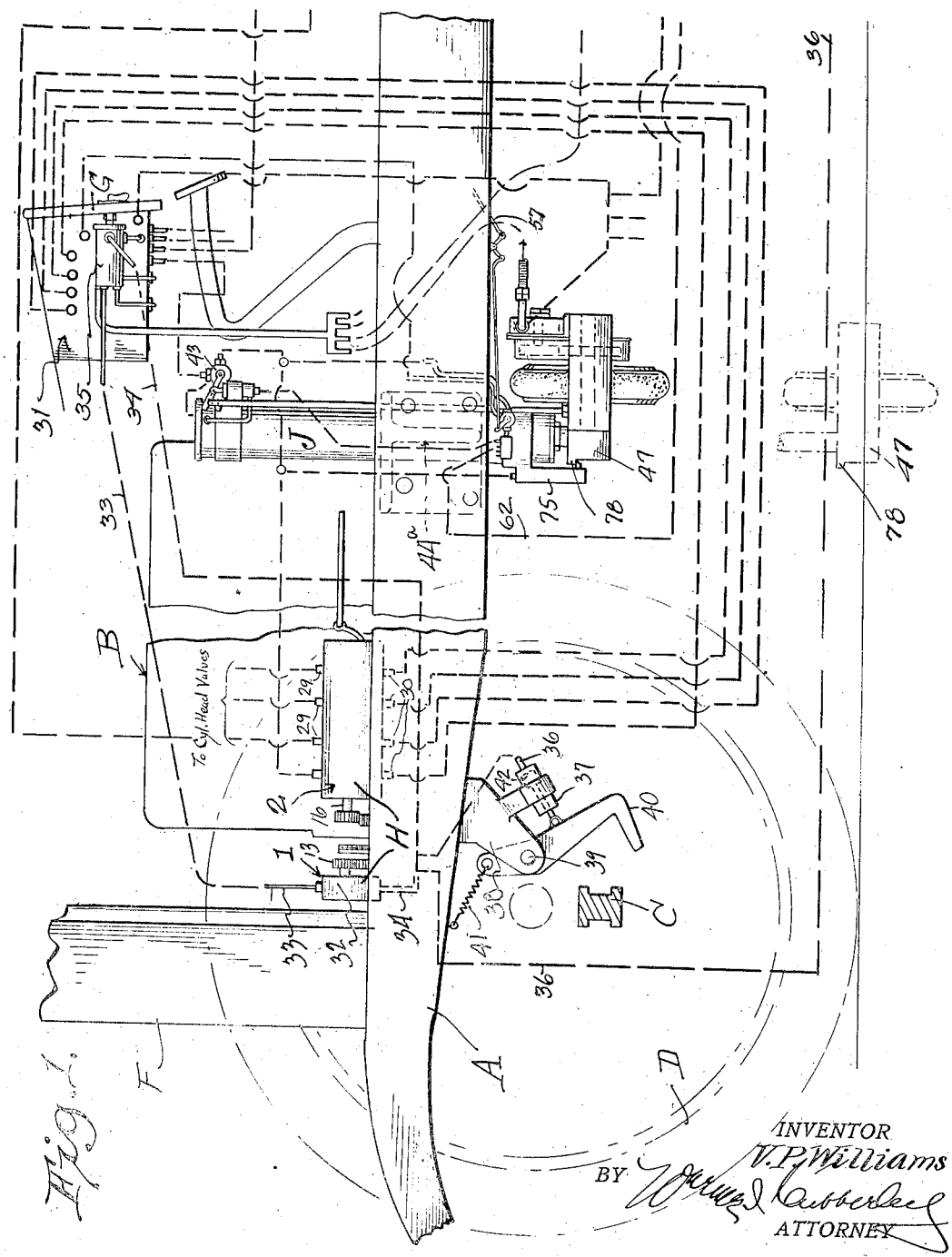

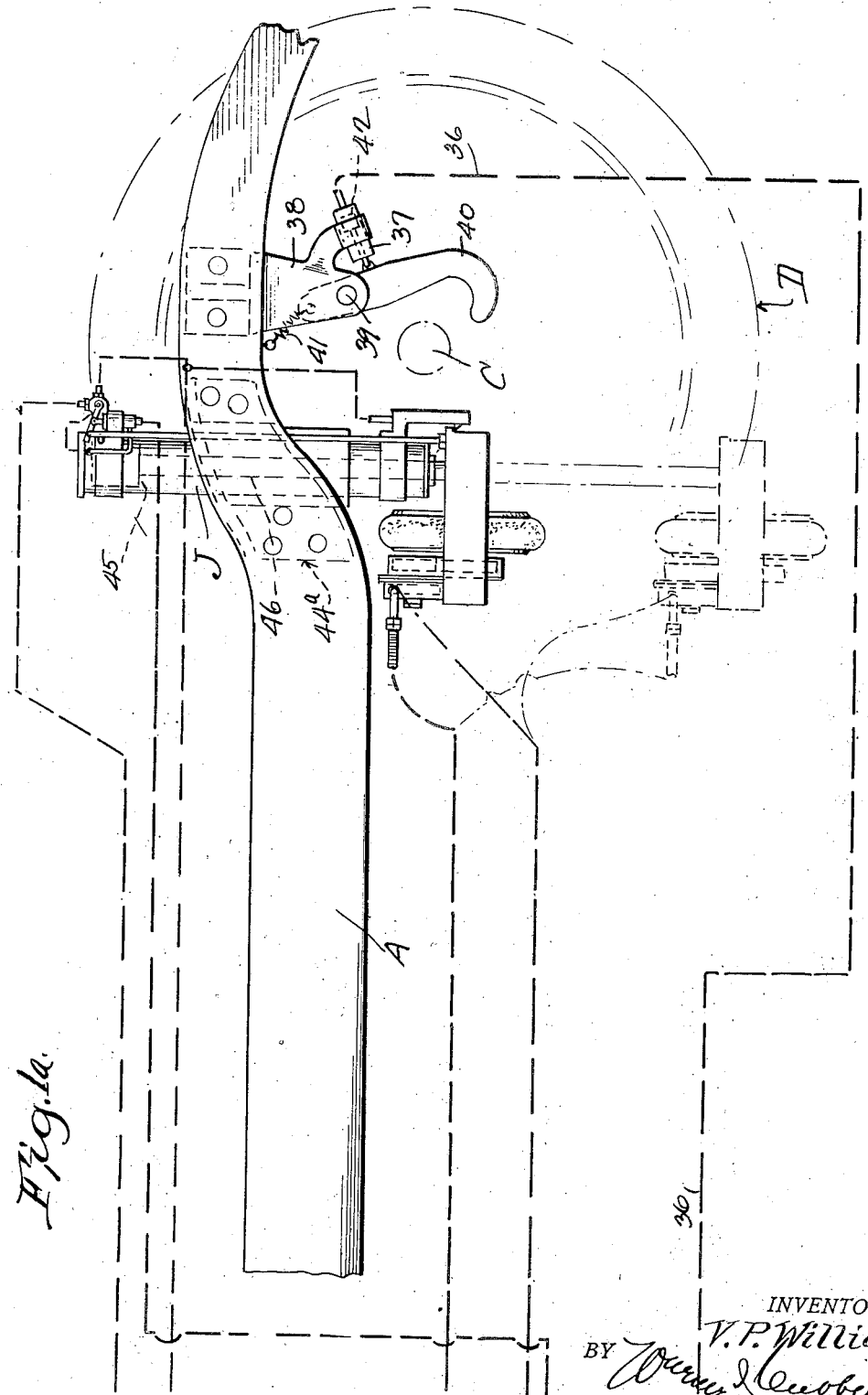

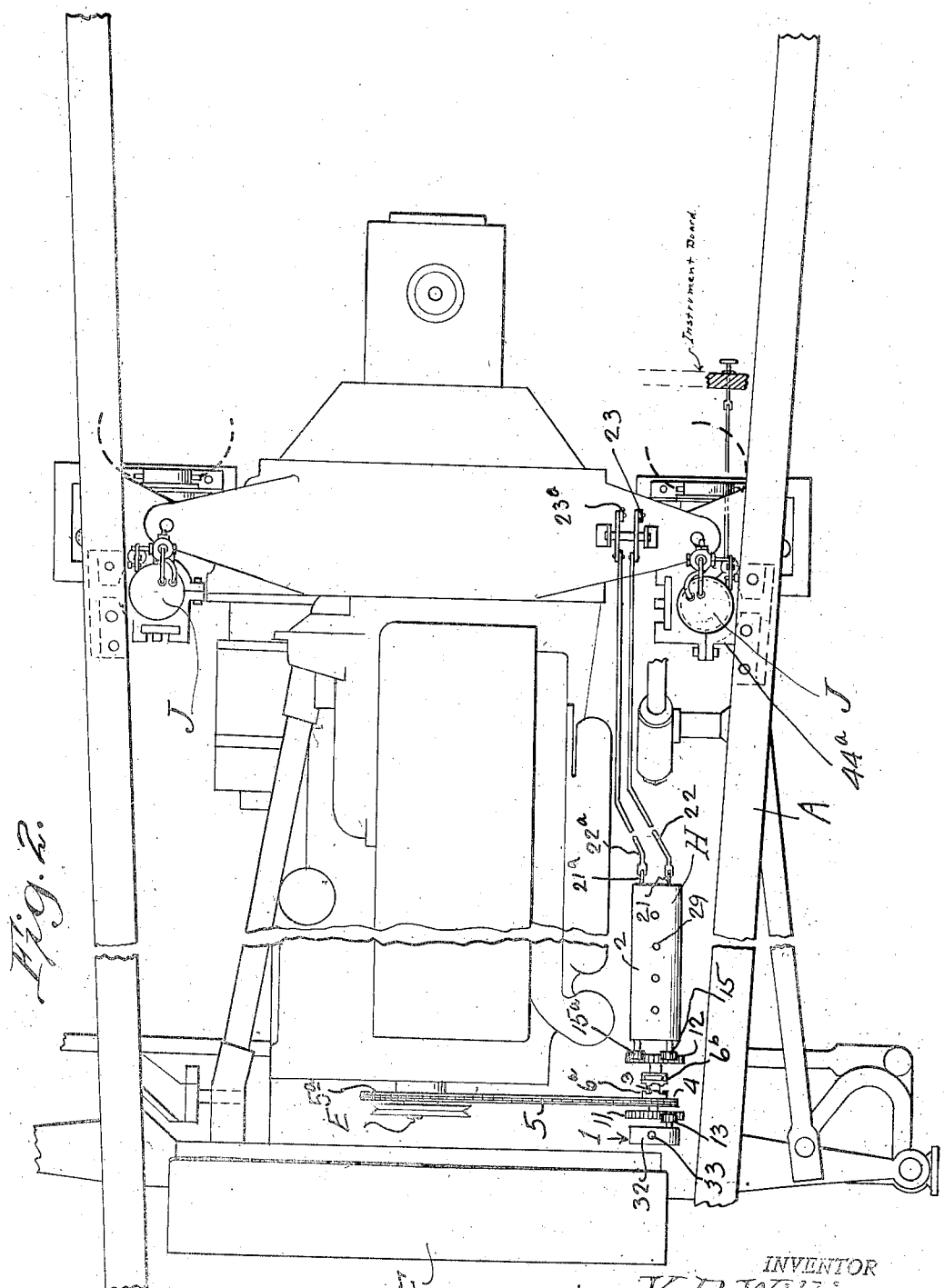

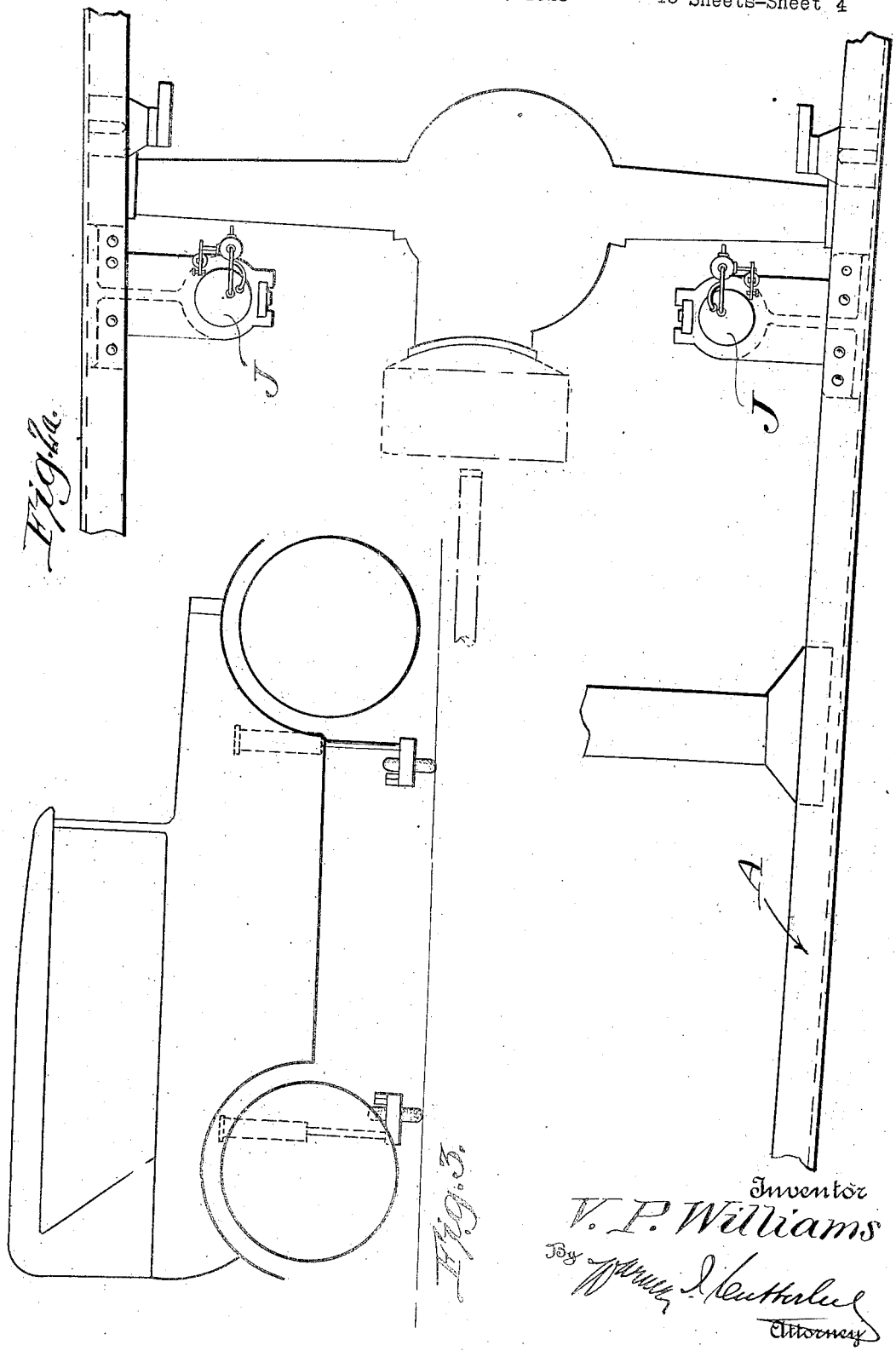

V. P. WILLIAMS 1,609,044

FLUID PRESSURE JACKING AND TRAVERSING MECHANISM FOR MOTOR VEHICLES

Filed May 7, 1925   15 Sheets-Sheet 5

INVENTOR
V. P. Williams
BY
ATTORNEY

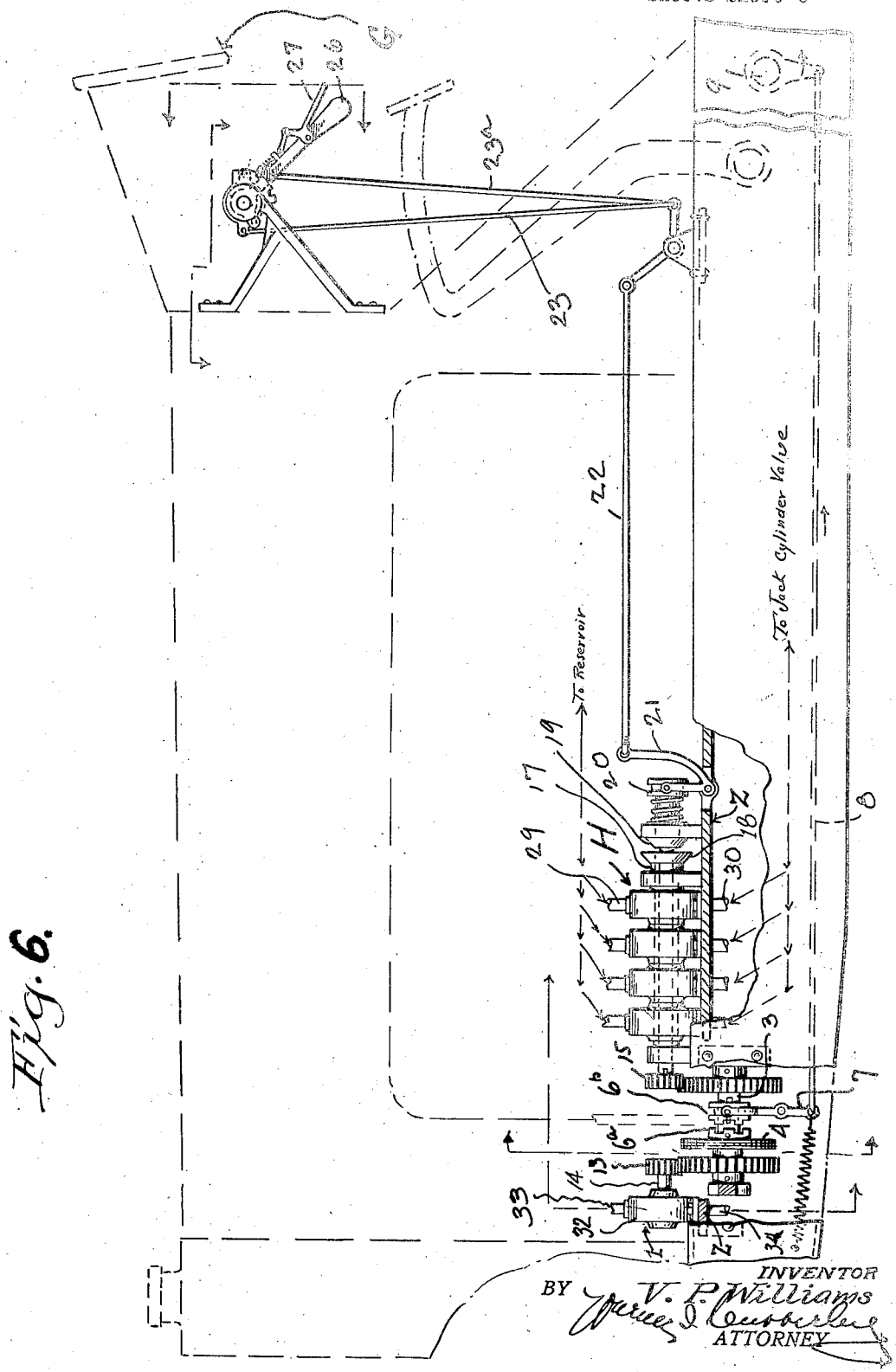

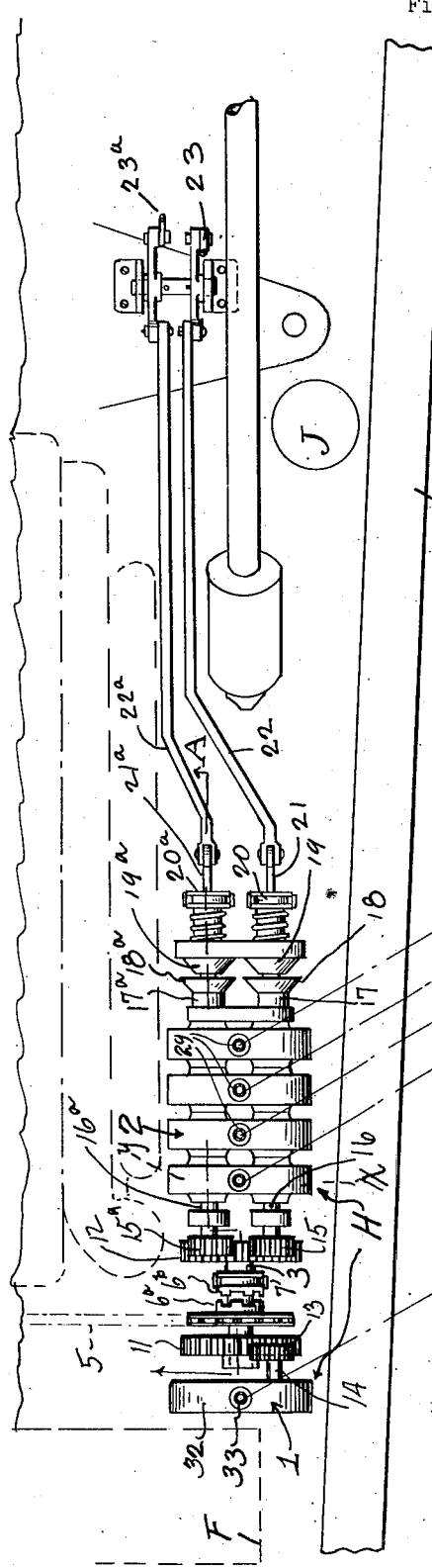
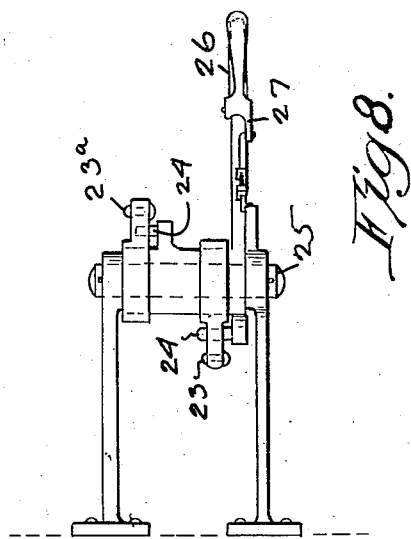
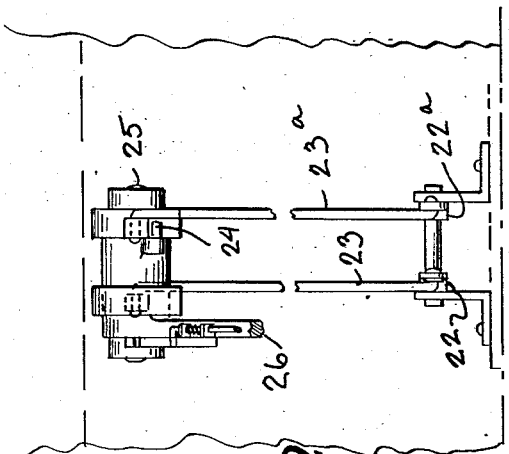

Nov. 30, 1926.

V. P. WILLIAMS 1,609,044

FLUID PRESSURE JACKING AND TRAVERSING MECHANISM FOR MOTOR VEHICLES

Filed May 7, 1925     15 Sheets-Sheet 8

INVENTOR
V. P. Williams
BY
ATTORNEY

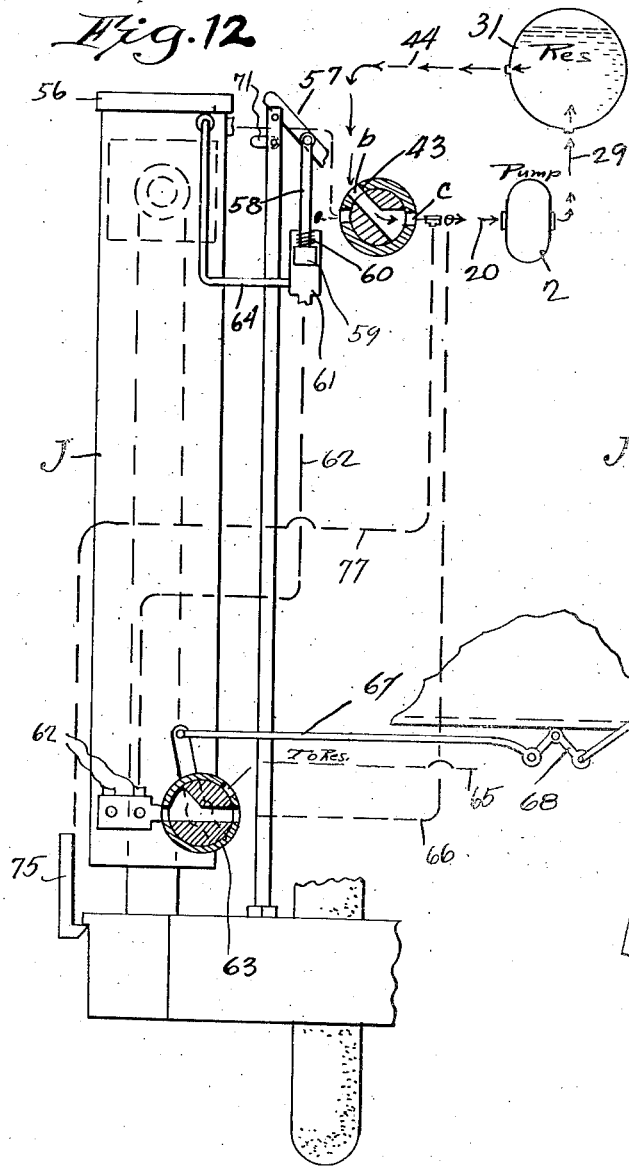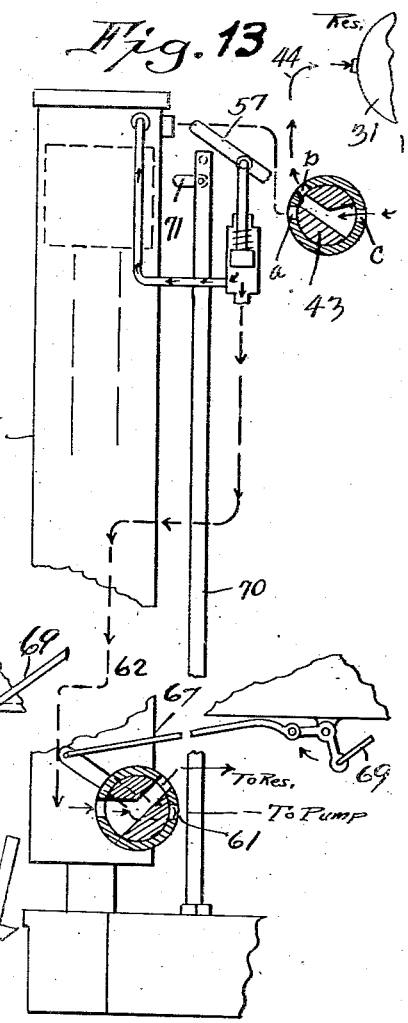

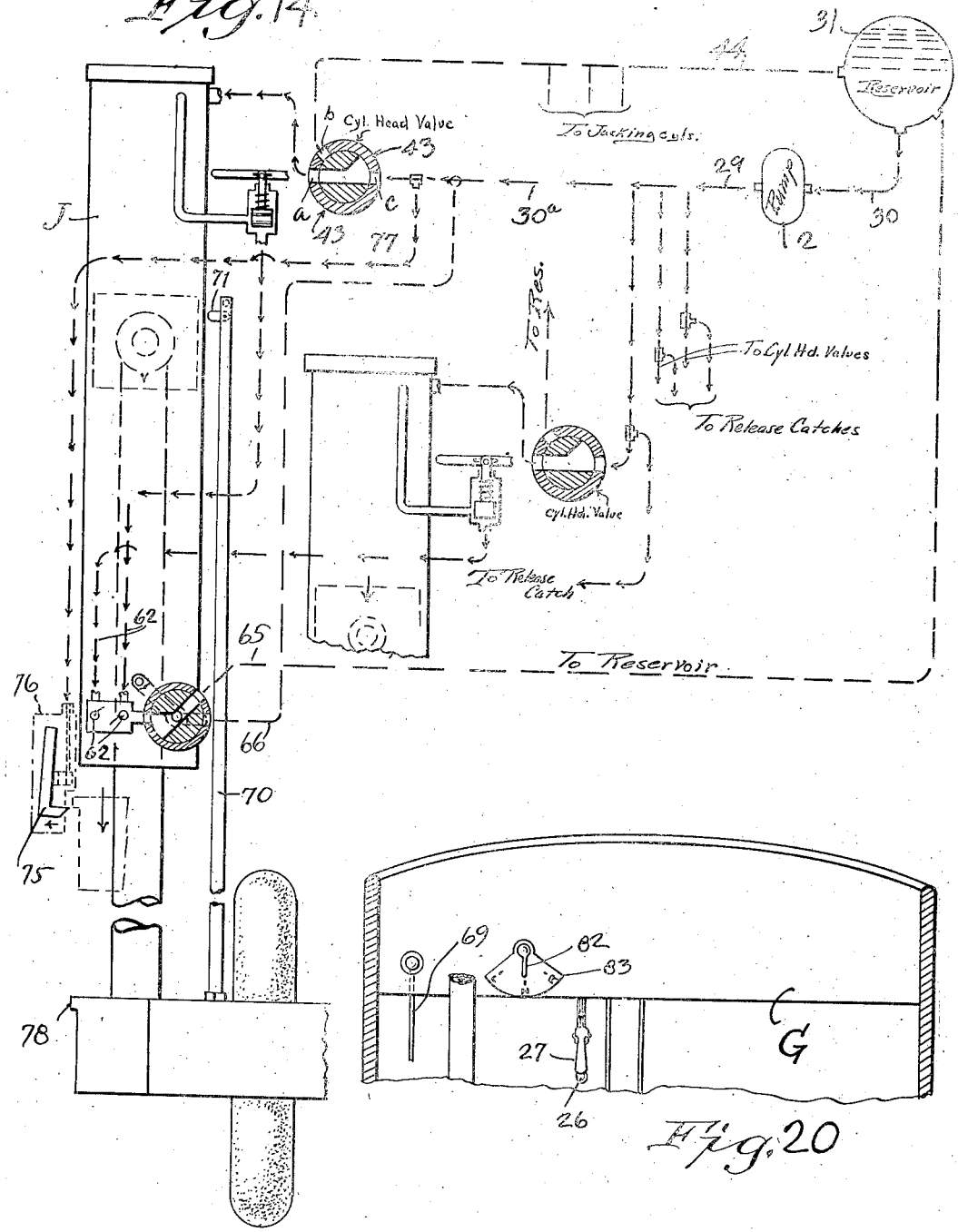

Nov. 30, 1926.  
V. P. WILLIAMS  
1,609,044  
FLUID PRESSURE JACKING AND TRAVERSING MECHANISM FOR MOTOR VEHICLES  
Filed May 7, 1925    15 Sheets-Sheet 11
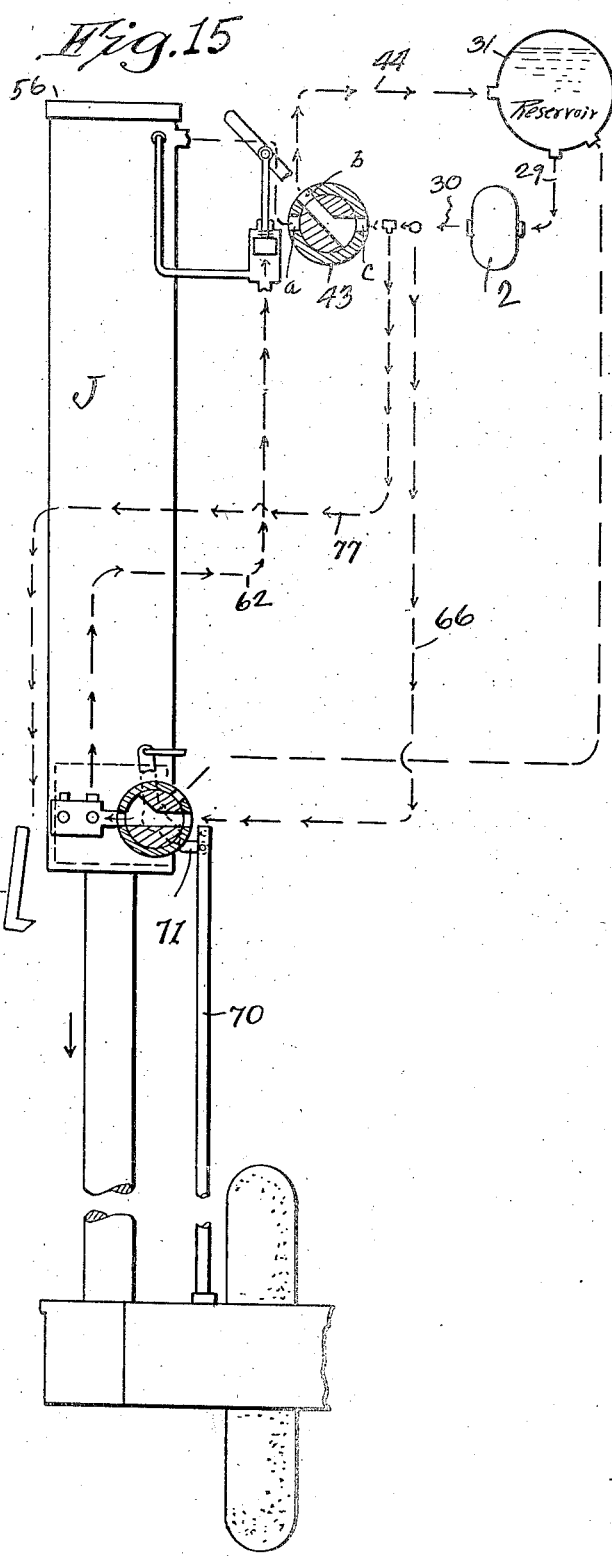
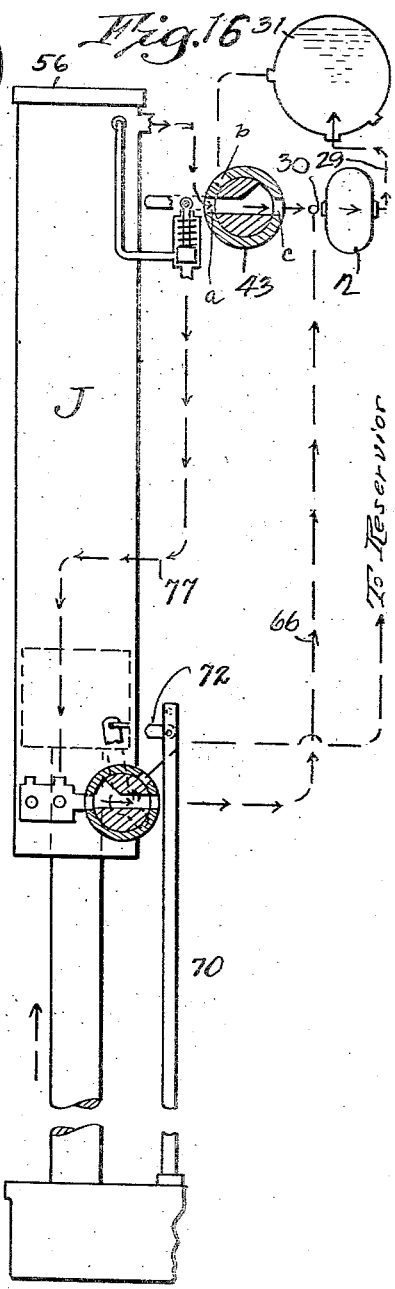

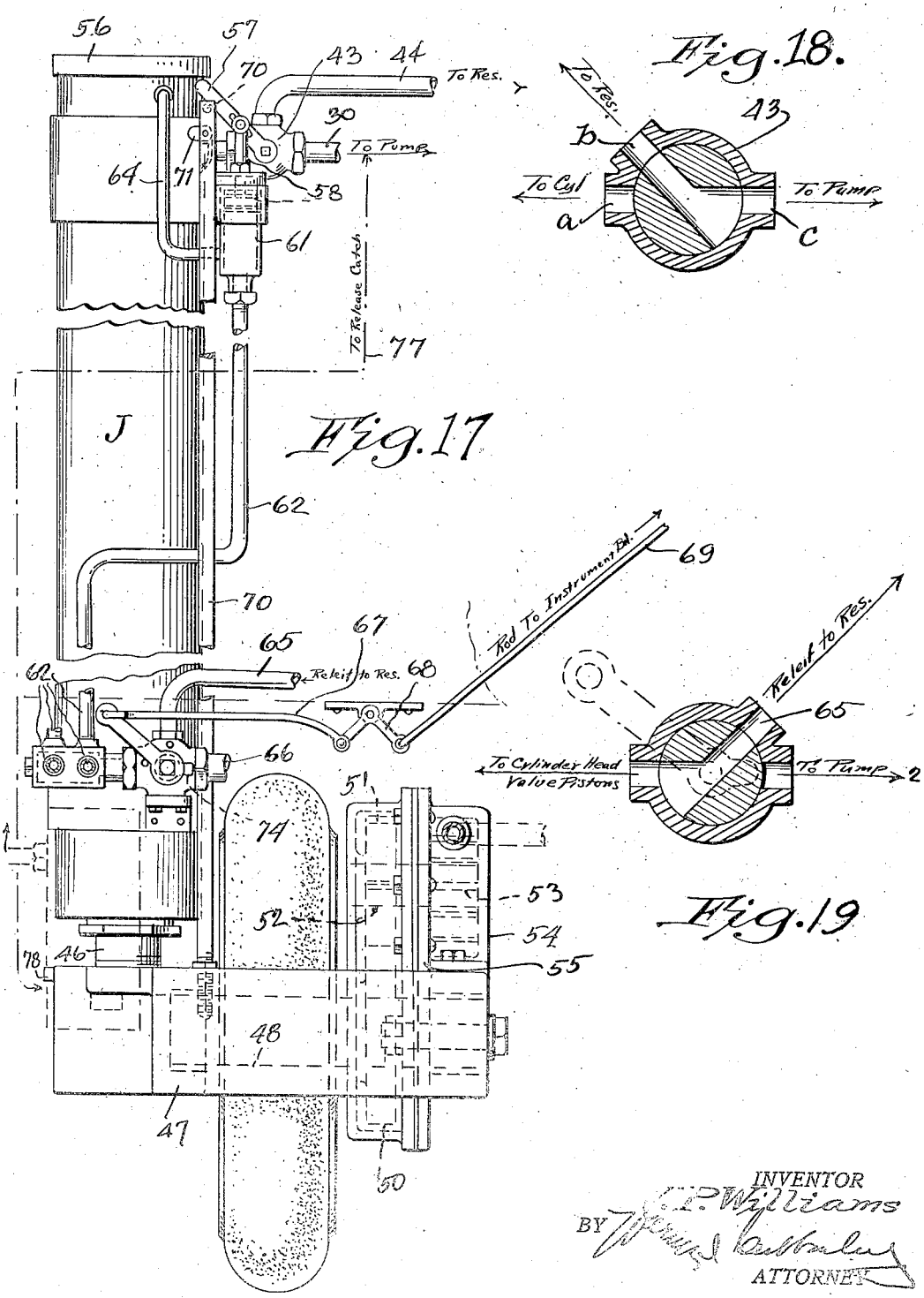

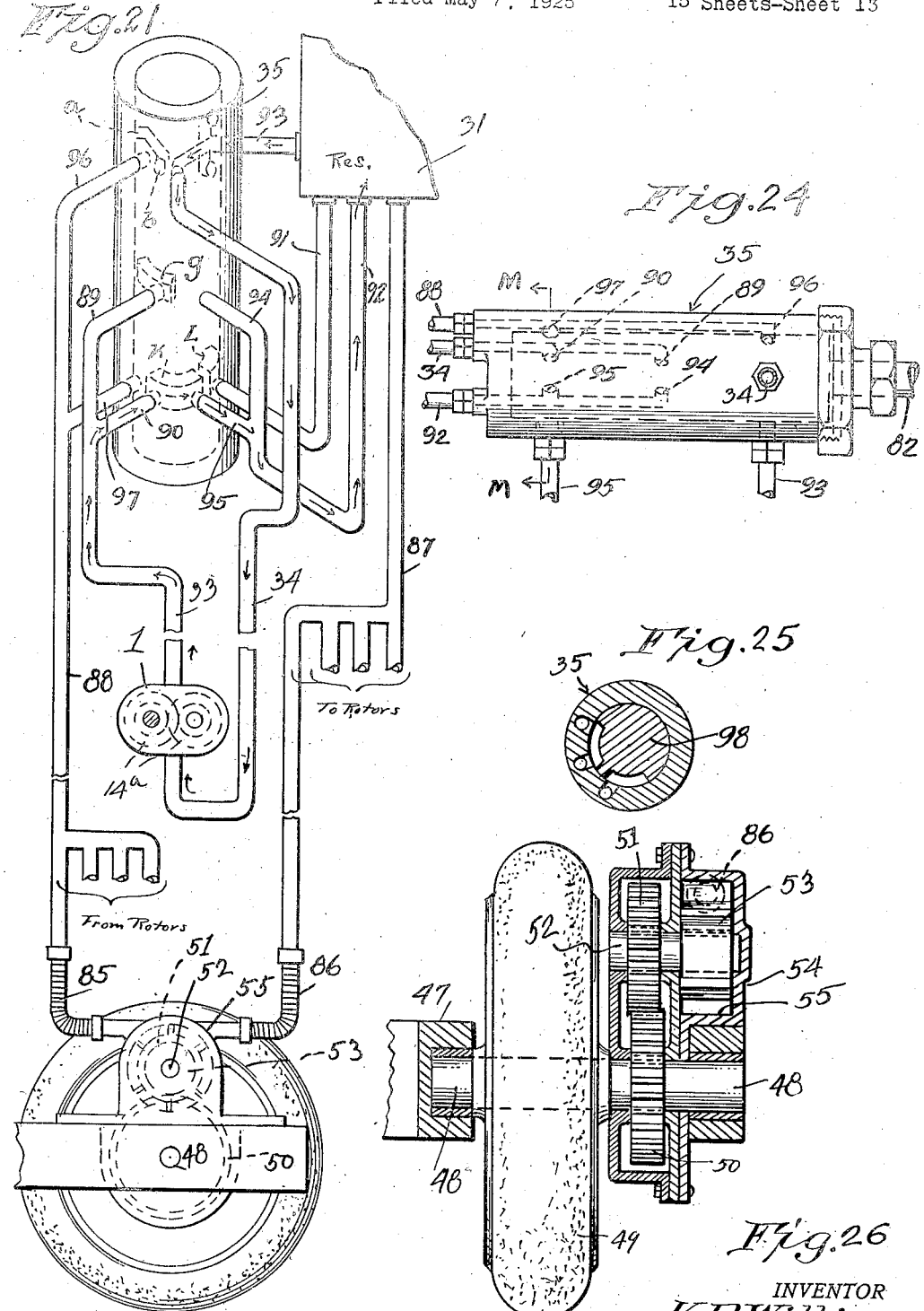

Nov. 30, 1926. 1,609,044
V. P. WILLIAMS
FLUID PRESSURE JACKING AND TRAVERSING MECHANISM FOR MOTOR VEHICLES
Filed May 9, 1925 15 Sheets-Sheet 14

INVENTOR
V. P. Williams
BY
ATTORNEY

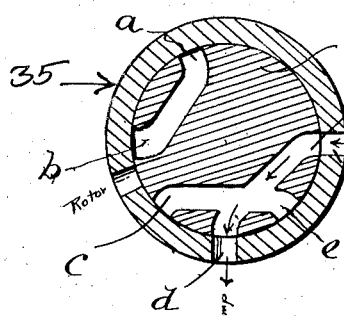
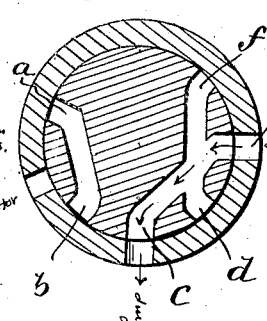
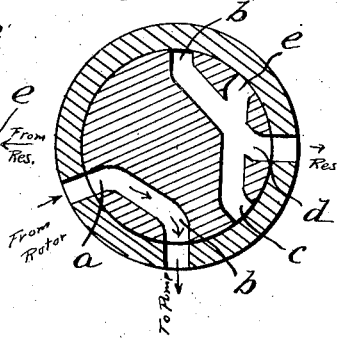
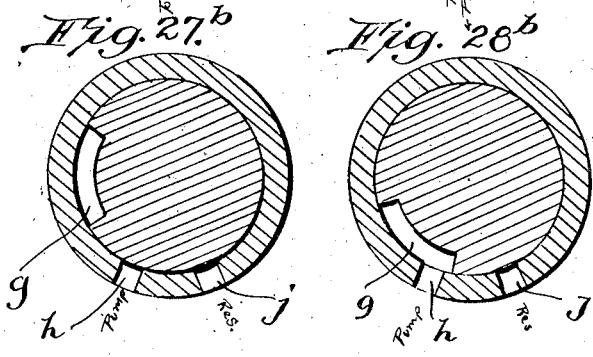
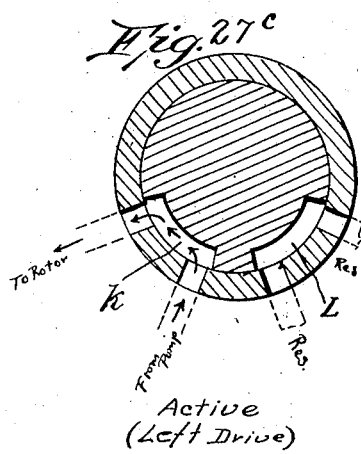
Active
(Left Drive)
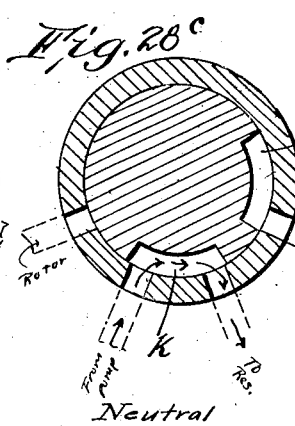
Neutral
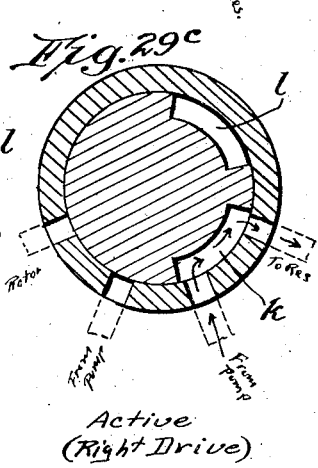
Active
(Right Drive)

Patented Nov. 30, 1926.

1,609,044

UNITED STATES PATENT OFFICE.

VILLOR P. WILLIAMS, OF BALTIMORE, MARYLAND, ASSIGNOR TO MIRIAM S. F. WILLIAMS, OF BALTIMORE, MARYLAND.

FLUID-PRESSURE JACKING AND TRAVERSING MECHANISM FOR MOTOR VEHICLES.

Application filed May 7, 1925. Serial No. 28,595.

In its broad aspect, my present invention has reference to the provision of improved all fluid pressure actuated and controlled jacking and traversing mechanism for bodily raising any given mobile body, such as an automobile, truck, tractor, or the like, in a vertical direction and then moving said object at an angle to its longitudinal axis and laterally with respect to its normal path of travel; and more particularly it is my purpose to actuate and regulate the operation of the several elements of my mechanism through the instrumentality of unique means for controlling the direction of flow and consequent distribution of pressure of fluid in a closed system of fluid circulation.

In the co-pending application for Patent Serial Number 742,409, filed October 8th 1924, of which I am joint applicant with Miriam S. F. Williams, there is defined a jacking and traversing apparatus wherein the traversing operation is entirely mechanical, and in the patent to Miriam S. F. Williams and John K. E. Diffenderffer, Number 1,473,369, granted November 6th 1923, both the jacking and traversing operations are entirely mechanical; in my present apparatus, however, not only are the jacking and traversing operations fluid pressure actuated and controlled, but all other active elements of my combination are uniquely associated with my system of fluid circulation for regulation, actuation and control, thereby distinguishing my present invention from the above mentioned and other devices in the art with which I am acquainted.

In its present embodiment, my invention is designed for use in facilitating the parking of an automobile or truck under modern traffic conditions, the exigencies of which necessitate accurate, rapid and positive response to the will of a driver of a vehicle. To this end I have provided for the automatic effecting of certain preliminary operations upon the manipulation of conventional braking devices of a vehicle; among these are the development of circulation in certain portions of my fluid circulation system and simultaneous and consequential automatic actuation of unique supporting or sustaining devices to an operative position for preventing the sagging of the running gear of the vehicle when it has been raised. The remaining operations of jacking or raising the vehicle and moving the same laterally to the desired position, and then lowering the vehicle and moving it into its normal path of travel are all accomplished in an absolutely positive manner by developing, through the instrumentality of selective control devices, different pressures in different portions of the system of fluid circulation; such pressures actuating the proper devices for accomplishing the desired ends, and being contingent largely upon the direction of flow of the fluid in the system. It has been found that greater smoothness and uniformity of operation results in the utilization of an all fluid power medium, and that looseness of parts, heating and vibration due to wear and the like are eliminated and the number of parts necessary to accomplish the desired results reduced to a minimum and those parts greatly simplified. It has also been found that an all fluid system of power transmission and control is more conservative in the consumption of power than mechanical apparatus, and for this reason, among others, my apparatus may be associated with any reasonably direct power transmission element of the power plant of a vehicle to which it is applied; it being not essential to operatively connect it directly with the main drive shaft of the vehicle.

Some of the principal advantages attributable to my invention may be briefly defined as follows; first, the utilization of a central power element divided into relatively independent units for respectively effecting the jacking and traversing operations, said units being in the form of improved gear pump devices for inducing circulation in certain portions of the system of fluid circulation, and each being operatively associated with any suitable power transmission unit of a power plant of a motor vehicle; second, the provision of unique clutch devices for automatically actuating certain devices of said power element when the vehicle is braked; third, the operative association of automatically controlled fluid pressure actuated supporting or sustaining means in the system of circulation for preventing sagging of the running gear of the vehicle when the vehicle is jacked up or raised; fourth, the provision of unitary valve means for changing the direction of circulation of fluid in certain portions of the system to change the direction of movement of the traversing apparatus; fifth, the provision of unique clutch devices for changing the direction of drive of the jacking unit of my pumping element to change the direction of circulation of fluid in certain portions of the system to raise or lower the vehicle; sixth, the attainment of positive control of the operation of the several units of my apparatus whereby to absolutely prevent inadvertent confusion in the sequence of operation of the several elements; seventh, the provision of unique fluid pressure controlled catch devices for retaining the traversing apparatus in a normally passive position, and; eighth, the utilization of unique valve control means for simultaneously priming the respective jacking elements.

With respect hereunto it will be understood that by the term fluid pressure I intend to include as the fluid means, oil, water, air, steam, vapor, or any other substance which might come within the broad meaning of the term, and that by the terms vehicle, truck and the like I intend to include any mobile body. The particular elements, however, of my jacking and traversing mechanism employed to accomplish the above and other equally important objects will be hereinafter more fully described in detail and defined in the claims appended hereunto and forming a part of this specification.

In the accompanying drawings wherein is illustrated the preferred embodiment of my invention;—

Figures 1 and 1ª, together, constitute a side elevation of my assembly; Figure 1 being a view of the front portion of a vehicle equipped with my apparatus, and Figure 1ª being a view of the rear portion thereof, Figures 2 and 2ª, together, constitute a top plan view of the assembly; Figure 2 being a view of the front portion of a vehicle equipped with my apparatus, and Figure 2ª being a view of the rear portion thereof, Figure 3 is a diagram showing a vehicle in the raised position.

Figure 6 is a detail side view of my power element or pump battery and certain of the manual control devices leading thereto, Figure 7 is a top plan view of the details shown in Figure 6.

Figure 8 is a detail top plan of the pump clutch operating lever,

Figure 9 is a detail side elevation of the pump clutch operating lever,

Figure 4:
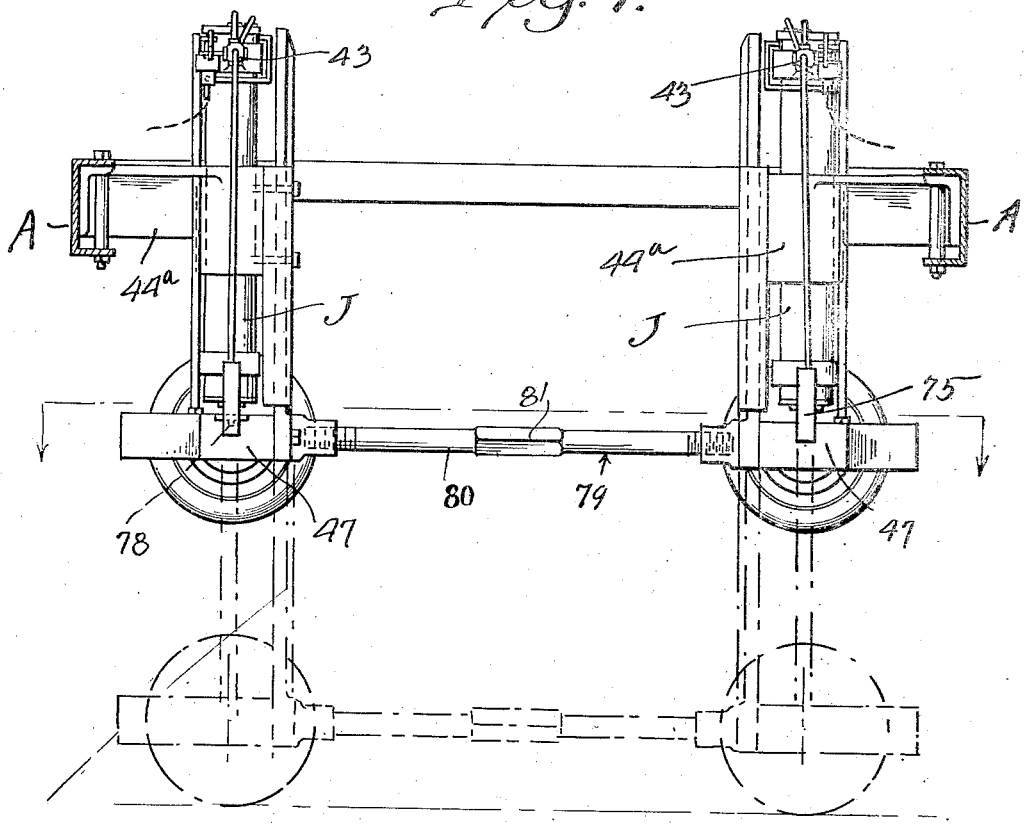
Figure 4 is a side elevation of one jacking and traversing unit.
Figure 5:
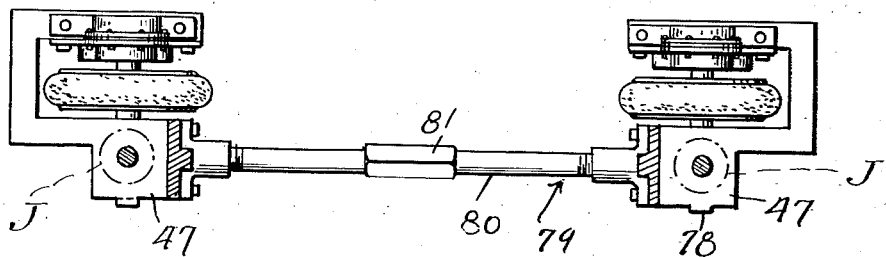
Figure 5 is a top plan view of one jacking and traversing unit.
Figure 10:
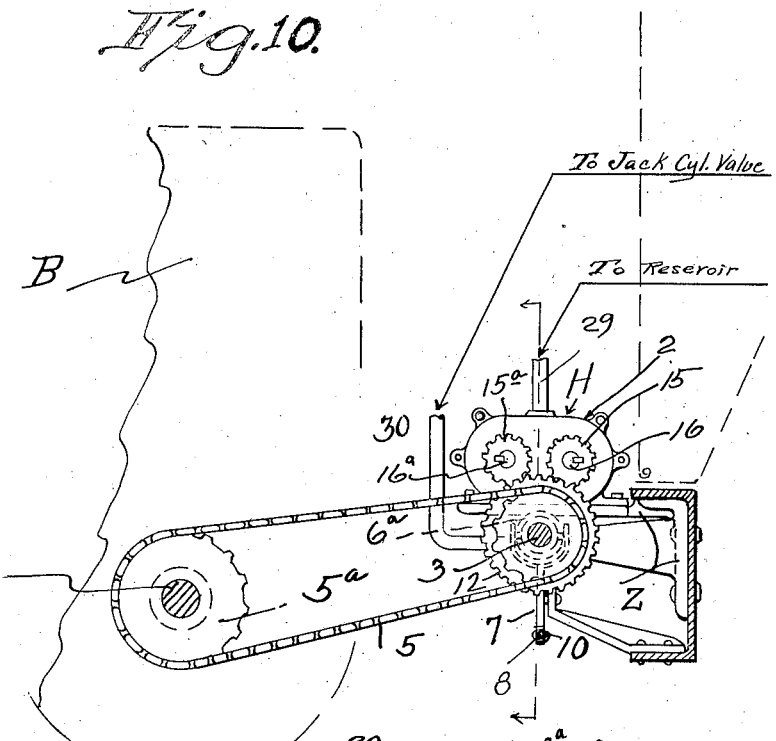
Figure 10 is a view taken on the line $x-x$ of Figure 7.
Figure 11:
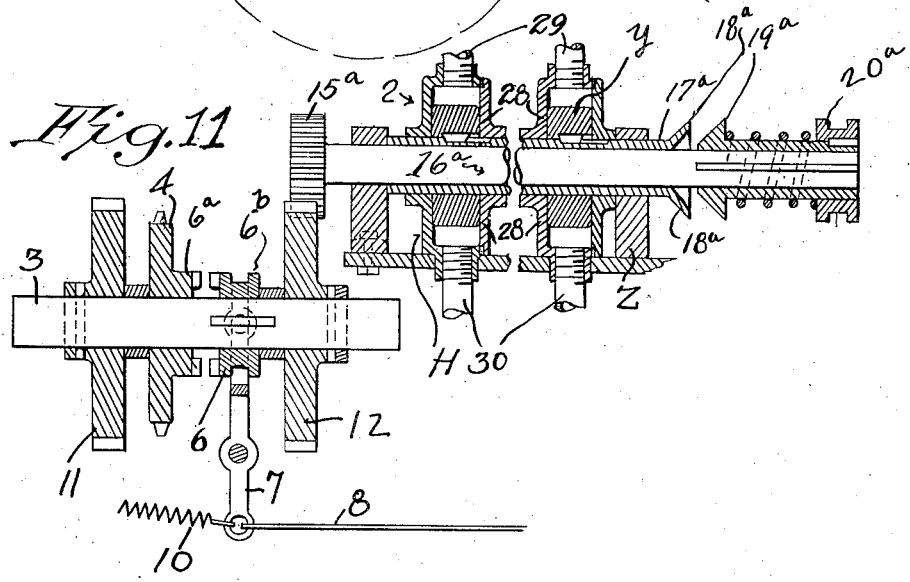
Figure 11 is a view taken on the line $y-y$ of Figure 10.
Figure 22:
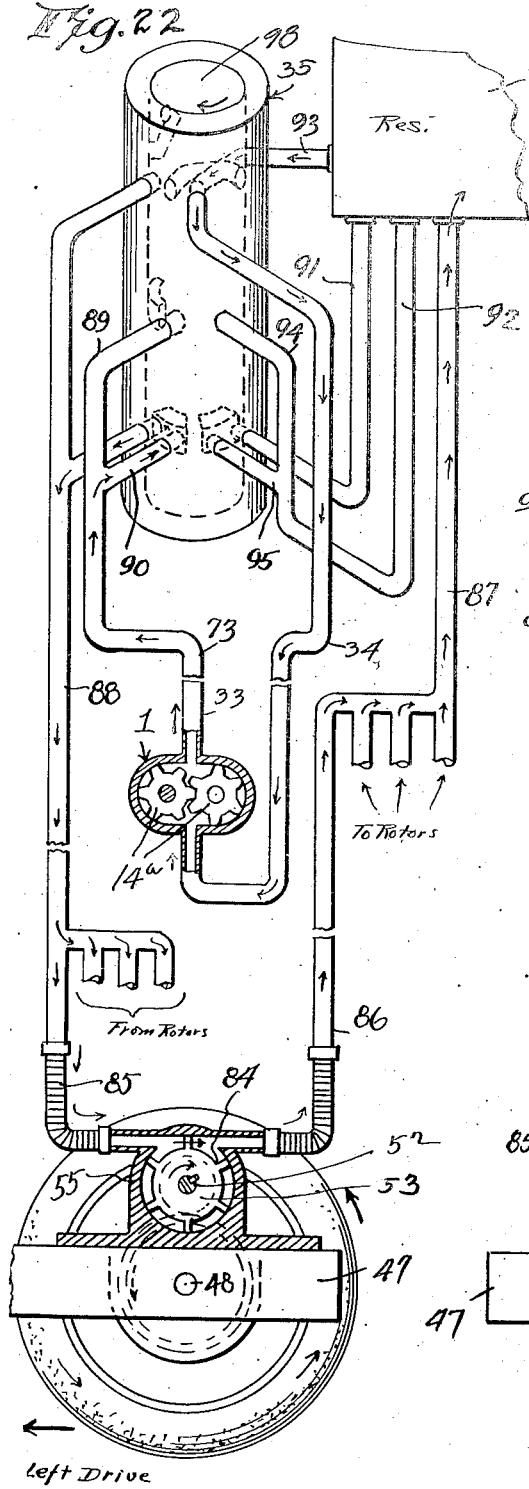
Figure 23:
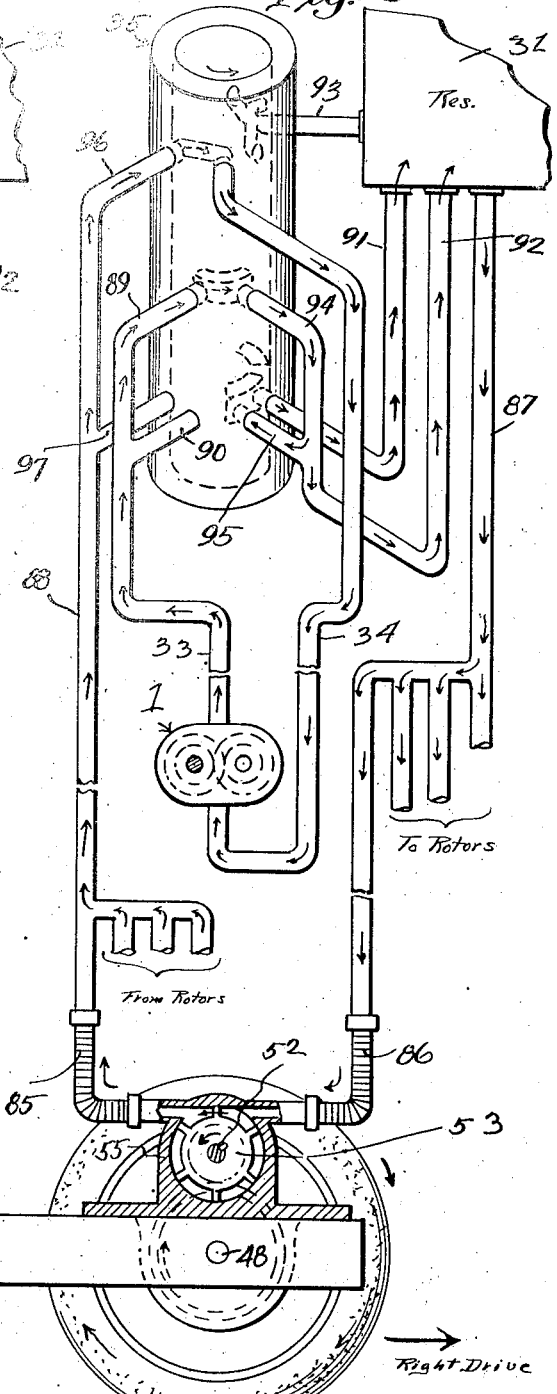

Figure 12 is a view of the cylinder and piston jacking and traversing unit of the left front wheel of a vehicle in a neutral position and showing a detail of the master valve thereon, Figure 13 is a view similar to that of Figure 12 but showing the arrangement of the valve apparatus and piston just preceding the commencement of a jacking operation, Figure 14 is a view similar to Figure 13 but showing the arrangement of the valve apparatus as the jacking operation is proceeded with, and other details are shown of similar piston and cylinder assemblies for other portions of the vehicle, Figure 15 is a view similar to Figure 14 but showing the arrangement of the several elements at the termination of a jacking operation, Figure 16 is a view similar to Figure 15 showing the arrangement of the several elements at the commencement of the vehicle lowering operation, Figure 17 is an enlarged side elevation of the left front wheel jacking and traversing unit, Figures 18 and 19 are sectional details of the master valve for priming the jacking and traversing units, Figure 20 is an elevation of the vehicle dash board controls of my apparatus, Figure 21 is a conventional view of my control valve with its ports in the neutral position, Figure 22 is a view similar to Figure 21 with the valve ports in position for traversing to the left, Figure 23 is a view similar to Figure 22 with the valve ports in position for traversing to the right, Figure 24 is a detail view of my control valve, Figure 25 is a section through my control valve taken on the line $m-m$ of Figure 24, Figure 26 is an enlarged detail view of a traversing wheel assembly partly in section to show the rotor and gear connections therefrom to the wheel, Figures 26ª, 26ᵇ, 26ᶜ are sections taken through various portions of my control valve and showing the ports thereof set for traversing to the left, Figures 27ª, 27ᵇ, 27ᶜ are sections taken through various portions of my control valve and showing the ports thereof set at neutral, and Figures 28ª, 28ᵇ, 28ᶜ are sections taken through portions of my control valve and showing the ports thereof set for traversing to the right.

In the several views of the drawings wherein like characters of reference designate like or similar parts;—

A designates conventionally a motor vehicle chassis assembly, B the power plant thereof, C the axle, and D the front and rear wheels—same being shown in dotted lines. E designates the fan belt drive shaft, F the radiator, and G the dash board of the vehicle. All of the foregoing are common to various types of motor vehicles and form no part of my present invention; being shown merely for the sake of clearly illustrating its application to a vehicle.

*Pump assembly.*—My central power element, or pump battery H, is mounted preferably beneath the hood of a vehicle and adjacent to its power plant B and to one side thereof—the support therefor being designated by z. My power element is formed in two units designated (1) and (2) respectively; the unit (1) being a gear pump assembly for developing circulation of fluid in that portion of my system of fluid circulation adapted for carrying out the traversing operation, and the unit (2) being a battery of gear pumps for developing circulation of fluid in those portions of my system of fluid circulation adapted for carrying out the jacking operation. A common drive shaft (3) for the units (1) and (2) is arranged therebetween and has mounted for rotation thereon a sprocket wheel (4) which is formed with a clutch element (6$^a$), and which is driven by a silent chain connection (5) from gear (5$^a$) on the fan belt drive shaft E of the motor (or from any other suitable rotating element of the power plant B). Inasmuch as the fan belt drive shaft E is constantly rotated when the power plant B is active, so also is the sprocket wheel (4) constantly rotated on shaft (3). Keyed to the shaft (3) is a clutch device (6$^b$) which is operatively connected by a fork and rocking lever assembly (7) and a rod (8) with the emergency brake (9) of the vehicle (or any other suitable braking element of the vehicle), same normally being held passive by a spring (10). Also keyed to the shaft (3) are gears (11) and (12). Consequently upon throwing the emergency brake (9) the clutch elements (6$^a$) and (6$^b$) will be coupled to the end that the shaft (3) and gears (11) and (12) will be rotated with the fan belt drive shaft E. Intergeared with the gear (11) is a sprocket (13) which same is mounted on a shaft (14) from which is driven the traversing gear pump (1) comprising intermeshing gear pump elements (14$^a$), so that the gear pump (1) will be automatically actuated when the emergency brake is thrown to stop the vehicle. Intergeared with the gear (12) are two sprockets (15) and (15$^a$) which are mounted on shafts (16) and (16$^a$). Mounted loosely on shafts (16) and (16$^a$) are sleeves (17) and (17$^a$), each of which is formed with a friction clutch element (18) and (18$^a$) respectively cooperating with friction clutch elements (19) and (19$^a$) which are splined respectively to shafts (16) and (16$^a$) for sliding movement but not for independent rotation. The gear elements or units $x$ and $y$ of pump battery unit (2) are keyed respectively to the sleeves (17) and (17$^a$), so that one or the other of such units or elements will be actuated depending on which of the clutches (19) and (19$^a$) is thrown to couple the cooperating sleeve with the respective shafts (16) or (16$^a$). The respective clutch elements (19) and (19$^a$) each carry a spring pressed collar designated respectively (20) and (20$^a$) and each operatively connected with the respective control rods (23) and (23$^a$) by links (21) and (21$^a$), and rods (22) and (22$^a$). The rods (23) and (23$^a$) engage selective pin operating detents (24) on a shaft (25). The shaft (25) has keyed thereto an operating lever (26) carrying a pawl locking device (27). By such means either one or the other (but not both) of the clutches (19) and (19$^a$) may be moved to couple for driving purposes either one or the other of the respective gear elements $x$ and $y$ depending upon whether the lever (26) is moved up or down. In the neutral position of the lever, shown in Figure 8, neither of the gear elements $x$ and $y$ are active as the clutch elements (19) and (19$^a$) are not engaged with the clutch elements (18) and (18$^a$), and the neutral position must be passed through to engage or disengage either one or the other of the respective clutches. The unit (2) of my power element is effective to induce fluid circulation in that portion of my system designed to effect the traversing operations, and by the foregoing devices either of the respective gear elements $x$ and $y$ of such unit (2) may be caused to function as the drive thereby changing the direction of circulation of fluid in the system. The unit (2) is manually controllable through operating lever (26) whereas unit (1) is automatically rendered active when the emergency brake of the vehicle is applied to bring it to a stop. Leading from the casings (28) of gear elements $x$ and $y$ of my gear pump unit (2) are pipes (29) and (30). The pipes (29) communicate with a fluid reservoir (31) and the pipes (30) lead respectively one to each of my four jacking cylinder assemblies J. Leading from the casing (32) of my gear pump unit (1) are pipes (33) and (34), both of which communicate with my traversing control valve assembly (35).

*Supporting devices.*—Tapped from pipe (34) of pump unit (1) are pipes (36), each of which lead to cylinders (37) carried on brackets (38) which pivotally support as at (39) the vehicle running gear supporting or sustaining catches (40). The catches (40) are held normally out of engagement with the axles C by springs (41). Since my present invention is designed to bodily raise a vehicle I have found it necessary to positively support or sustain the running gear of the vehicle to prevent sagging. Therefore inasmuch as the gear unit (1) is actuated as soon as the brakes are manipulated to bring the vehicle to a stop, same being affected through clutch devices (6ª) and (6ᵇ) and rod (8) leading to brake device (9), fluid circulation and consequent pressure is induced in the system exemplified by pipes (33) and (34). Therefore as soon as the vehicle is stopped pressure is induced in pipes (36) and in cylinders (37) to force pistons (42) therein which in turn move the catches (40) into engagement beneath the vehicle axles to support the running gear thereof when the vehicle has been raised, and preferably I provide a catch adjacent to each of the four wheels of the vehicle.

*Jacking apparatus.*—As has heretofore been suggested, there is located adjacent to each of the four wheels D of the vehicle to which my apparatus is applied a jacking cylinder assembly J. The units x and y of pump battery unit (2) are in a system of fluid circulation through pipes (29) and (30) with the reservoir (31) and each of the respective cylinder. By the means heretofore described the direction of rotation of the gears comprising units x and y may be reversed by clutches (19) and (19ª) to reverse the direction of circulation of fluid in the system; that is fluid may be caused to pass from the reservoir (31) through pump battery (2), and thence to the jacking cylinders; or from the jacking cylinders through the pump battery (2) and thence to the reservoir. This is manifest and needs no further explanation. However, each of the jacking cylinders is provided with a three way control valve (43), the ports a, b and c of which communicate with the jacking cylinder, the pipe (30) to the pump battery (2), and with pipe line (44) leading back to the reservoir (31). Consequently by properly positioning the valve (43) fluid may be caused to pass from the pump unit (2) either to the jacking cylinders, or to the reservoir (31) through pipes (44), or from the reservoir (31) through pipes (44), valve (43), pump unit (2) and back to the reservoir, or from the cylinders to the reservoir, when the direction of rotation of the gear pumps is reversed. Each of the cylinders is supported by a bracket (44ª) carried by the chassis of the vehicle and has operable therewithin a piston (45). Attached to the free end of each of the piston rods (46) is a frame (47) carrying a shaft (48) on which is mounted a traction wheel (49). Keyed to each shaft (48) is a gear wheel (50) which meshes with a gear (51) on a shaft (52). The shaft (52) is keyed to the rotor (53), and the frame (47) is provided with detachable covering elements (54) so that access may be had to the rotors although they are normally retained in a fluid tight enclosure or housing (55) formed by the structure of the frame. The valves (43) communicate respectively with the heads (56) of each of the cylinders, and each valve (43) is provided with an operating lever (57) which in turn is engaged by the stem (58) of a second valve (59) one of which is also mounted on each of the cylinders. Each valve (59) is spring pressed as at (60) to be normally urged toward the base of its housing (61), and each housing (61) communicates through a pipe (62) with a single master control valve (63) carried, in the present instance, on the cylinder located adjacent to the left front wheel of the vehicle. The housing (61) of each valve (59) also communicates with the head (56) of its adjacent cylinder through a pipe (64). The valve (63) is arranged, through the instrumentality of pipes (65), (66) and (62) in a system of fluid circulation with the reservoir (31), pump unit (2) and the housings (61) of valves (59). The master valve (63) is controlled from the dash G of the vehicle through levers (67) and (68) and a push rod (69).

*Automatic trips.*—Carried by the respective frames (47) and extending vertically adjacent each of the cylinders are rods (70), on the upper ends of each of which is a pin (71). The pins (71) are each adapted to engage the levers (57) to move the valves (43) into their neutral position when the pistons (45) have reached their upward limit of movement. The rod (70) adjacent to the cylinder located at the left front wheel of the vehicle is also provided with a pivoted pin (72) which is arranged below the pin (71) and is engaged by a spring (73) so that while the pin (72) will engage a finger (74) on the control lever of the master control valve (63) to move said valve to its neutral position at the limit of downward movement of the piston (45), it will wipe the finger on the upward stroke and thus not disturb the valve.

*Frame catches.*—In order to hold the frames (47) in a retracted position until they are desired to be released to jack or raise the vehicle, I have provided catches (75), one for each frame, and mounted in housings (76) on each of the cylinders. Each housing carries a piston which engages the catch, and the pistons are controllable through by-pass pipe lines (77) to pipes (30) from pump unit (2) to valves (43). Thus immediately upon actuating pump unit (2) to induce pressure in the lines (30) the catches (75) are released to permit downward movement of the frames. The frames (47) are each formed with a lip (78) which is adapted to be engaged to retain the frame.

*Reinforcing rods.*—As has been stated there are four jacking assemblies J, one located adjacent to each of the four wheels of a vehicle. In order, however, to prevent possible distortion of these assemblies, to insure synchronization of movement, and to rigidify the apparatus as a whole, I connect the frames (47) of the two front cylinder assemblies J, and the two rear cylinder assemblies by cross rods (79) which are rendered adjustable by means of threaded bodies (80) having squared portions (81) adapted to be engaged by a wrench or other tool, thereby to adjust the assemblies to insure perfect alignment, and rigidify the apparatus or take up possible slack.

*Operation of jacking apparatus.*—The operation of my jacking apparatus is as follows: There are four jacking cylinder assemblies J located at suitable points one adjacent to each of the four wheels D of a vehicle to which my apparatus is applied. Each cylinder is in a system of fluid circulation with the pump unit (2) and reservoir (31), and controllable each by a valve (43). The vehicle braking device (9) having been manipulated to stop the same, the pump unit (1) is actuated to induce circulation in a closed system through the valve (35) and pipes (33) and (34). Since, however, the catches (40) are controllable by fluid pressure in pipes (36) tapped to pipes (34), and operating on pistons (42) they are moved to engage beneath the axles to sustain or support the running gear of the vehicle when it has been raised or jacked up. The lever (26) is now moved to throw the clutch element (19ª) into engagement with the clutch element (18ª) whereupon the gear unit y is coupled to shaft (16ª). Shaft (16ª) is actuated through gears (15ª), gear (12), shaft (3) and the fan belt drive shaft E. The pump unit (2) is now active to induce circulation of fluid from the reservoir (31) through pipes (29), pump unit (2), pipes (30), control valves (43), pipes (44) and back to the reservoir (31); the ports in valves (43) being in the position shown in Figure 12. The pressure in pipes (30) and (77) now operates to release catches (75) and the pistons and frames (45) and (47) respectively of their own weight move slightly downward to the position shown in Figure 13. The rod (69) is now pushed to move the master valve (63) into the position shown in Figure 13 with its ports arranged to permit escape of pressure (fluid) through pipes (62) from valves (59) to the reservoir through pipes (65). The springs (60) now move the valves (59) downwardly with the result that control valves (43) are moved to the position shown in Figure 14—the ports a, b and c of the valves permitting fluid circulation (and consequent pressure) from pump unit (2) through pipes (30) and cylinder heads (56) thereby forcing the pistons down to jack up or raise the vehicle. When the pistons reach their downward limit of movement, catch (71) on rod (70) engages the finger (74) of the master control valve (63) to move the master control valve into the position shown in Figure 16 in which case circulation (and consequent pressure) is through pipes (30) from pump unit (2), pipe (65), valve (63) and pipes (62) to the housings (61) of the valves (59) thereby forcing the pistons in said valves up to move the control valves (43) to the positions shown in Figure 15. Circulation is now through pipes (29) and (30), valves (43) and pipes (44) back to the reservoir. The cylinders are cut off and the vehicle is maintained in its raised position. To lower the vehicle the lever (26) is moved up to disengage clutch element (19ª) and engage clutch element (19) with its cooperating clutch element (18) thereby driving the pump unit through gear element x instead of y which reverses the action of the pump and induces circulation in the system as follows;—from the reservoir (31), through pipes (44), valves (43), pipes (30), pump unit (2) to pipes (29) and back to the reservoir (31). This causes suction in pipes (66) and (62) through master valve (63) thereby drawing down the valves (59) and moving valves (43) to the position shown in Figure 16. In this case the fluid is drawn by the pump unit (2) from the cylinders through valves (43)—ports a, b and c being in action—pipes (30), pump (2), through pipes (29) to the reservoir (31), thereby drawing the pistons (45) into the cylinders and lowering the vehicle. However, when the vehicle reaches its lowered position the rods (70) have moved so that pins (71) engage levers (57) to cause the valves (43) to again assume the position shown in Figure 12 with catches (75) engaging lips (78) on frames (47) to hold the jacking assemblies in a retracted position.

*Traversing apparatus.*—In practice the vehicle to which my apparatus is applied is first bodily elevated or jacked up in the manner heretofore described, whereupon the traversing apparatus is rendered active in the following manner. As has heretofore been stated my traversing apparatus is actuated through gear pump unit (1) which in turn is coupled by silent chain (5), gear (4), gear (11), pinion (13) and clutch devices (6ª) and (6ᵇ) to fan belt drive shaft E. The gear pump casing (32) is arranged in a system of fluid circulation through the control valve assembly (35) through the instrumentality of pipes (33) and (34). When the vehicle is brought to a stop by means of brake devices (9) the clutch elements (6ª) and (6ᵇ) are engaged to actuate pump unit (1) which is in the neutral position exemplified by the closed system of fluid circulation to the reservoir above defined. The control valve assembly is arranged preferably behind the dash board G of the vehicle with its valve body connected to a control lever (82) moving over a dial (83) provided with indicia indicating left drive, right drive, and neutral.

In the preceding description each rotor assembly was described as comprising a rotor (53) in a housing (55), said rotors being operatively geared to the respective traction wheels (49) carried by the frames (47). The housing of each rotor communicates on either side of the blades (84) of the rotor with flexible pipes (85) and (86). The respective pipes (86) communicate with the reservoir (31) through a service pipe (87), and the respective pipes (85) communicate with the control valve assembly through a service pipe (88). The pipe (33) from the pump unit (1) has two ports, shown conventionally in Figures 21, 22, and 23 as branches (89) and (90) communicating with the control valve assembly at ports $a$ and $b$, Figures 26$^a$ and 26$^c$, while the pipe (34) from the pump unit communicates with the control valve assembly at but one point. The reservoir (31) has three pipes (91), (92) and (93) leading to the control valve assembly, of which the pipe (92) has two outlets (94) and (95). The pipe (85) has two ports shown in Figs. 21, 22 and 23 as branches (96) and (97) to the control valve assembly. The operation of my traversing apparatus will be described with reference to the setting of the control valve.

*Neutral position.*—In the neutral position the body (98) of the control valve is set with its communicating ports $a$ and $b$ out of registry with port or branch (96) of pipe (85) and its ports $c$, $d$, $e$ and $f$ in the position shown in Figure 26$^a$, namely with ports $d$ and $f$ permitting circulation of fluid from the reservoir (31) through pipes (93) and (34) to the pump unit (1); ports $h$ and $j$ of the valve body (see Figure 26$^b$) are closed as well as is port $g$, but ports $k$ and $l$ permit circulation through pipes (33) and (90), (95) and (92), to the reservoir. Referring to Figure 21 it will therefore be seen that while the pump unit is active no circulation of fluid takes place in pipes (85) or (86) and the traction wheels (49) are therefore idle.

*Left drive.*—Assuming now that it is desired to laterally move the vehicle to the left. The lever (82) is moved on dial (83) to position the control valve body so that ports $c$ and $e$ permit circulation of fluid through pipes (93) and (34) to the pump unit from the reservoir. The ports $k$ and $l$ in turn are set to permit circulation from pump unit (1) through pipes (33), (90), (97), (88) and (85) to the respective rotors. The rotors will therefore be actuated by pressure of fluid on their blades (84) to propel the vehicle in the direction of the arrow in Figure 22. Complete circulation to the reservoir from the rotor housings (55) takes place through pipes (86) and (87).

*Right drive.*—It is now assumed that it is desired to move the vehicle laterally and to the right. The lever (82) is now moved over the dial (83) to position the control valve body so that ports $a$ and $b$ permit circulation through pipes (85), (88), (96), (33) to the pump unit (1), and ports $h$ and $j$ are set (see Figure 28$^b$) to permit circulation from the pump unit through pipes (34), (89), (94) and (82) to the reservoir. The circulation defined by pipes (95) and (91) is a closed one to the reservoir. Therefore as the pump unit is drawing fluid from pipes (33), (96), (88) and (85) and returning it to the reservoir, the pressure back of the blades (84) of the rotors (53) will cause them to actuate the traction wheels (49) to move the vehicle in the direction of the arrow in Figure 23.

While in the foregoing, there has been described and illustrated such combination and arrangement of elements as constitute the preferred embodiment of my invention, it is nevertheless desired to emphasize the fact that interpretation of the invention should only be conclusive when made in the light of the subjoined claims.

What I claim as new is as follows:—

1. Jacking and traversing apparatus for mobile bodies comprising a power unit arranged in a closed system of fluid circulation, means arranged in the system of fluid circulation for moving the body as a whole in a lateral direction, means for bodily raising the body substantially horizontally as a whole arranged in the system of fluid circulation, and means for regulating the operation of the power unit for changing the direction of fluid circulation in the system to control the action of the jacking and traversing means for the purpose defined.

2. Jacking and traversing apparatus for mobile bodies comprising a power unit formed with relatively independent power elements all arranged in a closed system of fluid circulation, means arranged in the system of fluid circulation for moving the body laterally as a whole in a lateral direction, means for bodily raising the body substantially horizontally as a whole arranged in the system of fluid circulation, means for controlling the operation of the elements of the power unit for regulating the manner of fluid circulation in the system, and said laterally moving and bodily raising means being controllable through regulation of the manner of circulation of fluid in the system.

3. Jacking and traversing apparatus for mobile bodies comprising means for laterally moving the body, means for bodily elevating the body substantially horizontally as a whole, a closed system of fluid circulation, said aforementioned means being arranged in said fluid system, and a power element, said power element adapted to effect circulation of fluid in the system for actuating said aforementioned means.

4. Jacking and traversing apparatus for mobile bodies comprising means for laterally moving the body, means for bodily elevating the body substantially horizontally as a whole, a closed system of fluid circulation, said aforementioned means being arranged in said fluid system, a power element formed with relatively independent units each arranged in the system of circulation and effective to actuate independently the respective aforementioned means, and control devices for regulating the direction of circulation in predetermined portions of the system to regulate the operation of said means.

5. Jacking and traversing apparatus for motor vehicles comprising supplementary traction devices for moving the vehicle in a direction at right angles to its normal direction of travel, means operatively connected with the traction devices for bodily raising a vehicle substantially horizontally as a whole, a closed system of fluid circulation, said traction devices and said vehicle elevating devices being arranged in the system, a power unit formed with relatively independent power elements, each element controlling the circulation of fluid in a portion of said system, and said traction devices and said vehicle elevating devices being operatively associated with the respective portions of the system whereby to be independently actuated by the respective elements of the power unit.

6. Jacking and traversing apparatus for motor vehicles comprising supplementary traction devices for moving the vehicle in a direction at right angles to its normal direction of travel, means operatively connected with the traction devices for bodily raising a vehicle substantially horizontally as a whole, a closed system of fluid distribution, said traction devices and said vehicle elevating devices being arranged in said system, a power unit in the system, control devices arranged to effect actuation of said power unit to induce circulation of fluid in portions of said system to move the vehicle laterally, control devices associated with the power unit for changing the direction of lateral travel of the vehicle, control devices associated with said power unit for changing the direction of circulation in portions of said system, and said vehicle raising devices being associated with the last mentioned portions of the system to raise the vehicle when circulation is induced in said portion of the system in one direction, and lower the vehicle when circulation is induced in said portion of the system in another direction.

7. Jacking and traversing apparatus for motor vehicles comprising means for bodily raising a vehicle substantially horizontally as a whole, means for laterally moving a vehicle in a direction at right angles to its normal path of travel, each of said means being arranged in a closed system of fluid circulation, a power unit, and said power unit being formed with relatively independent power elements, and each element being operatively associated with said system of fluid circulation to control circulation in portions thereof to operate said raising and lateral moving means selectively.

8. Jacking and traversing apparatus for motor vehicles comprising means for bodily raising a vehicle substantially horizontally as a whole, means for laterally moving a vehicle in a direction at right angles to its normal path of travel, each of said means arranged in a closed system of fluid circulation, a power unit, said power unit being formed with relatively independent power elements, each element being operatively associated with said system of fluid circulation to control circulation in portions thereof to operate said raising and lateral moving means selectively, and valve devices for reversing the direction of circulation in portions of said system to control the direction of movement of said vehicle.

9. Jacking apparatus for motor vehicles comprising a plurality of traction devices, cylinder and piston assemblies operatively connected one with each of the traction devices, said cylinder and piston assemblies being arranged in a closed system of fluid circulation, a power unit in said system, and means for reversing the action of the power unit to reverse the direction of circulation in the system to reciprocate the pistons in the cylinders to bodily raise and lower the vehicle substantially horizontally as a whole.

10. Traversing apparatus for motor vehicles comprising a plurality of traction devices, power transmission devices operatively associated with each of the traction devices, said power transmission devices being arranged in a system of fluid circulation, a power unit in said system, and valve means for reversing the direction of circulation in the system to reverse the direction of movement of said power transmission devices whereby to move said vehicle in any one of several directions at right angles to its normal path of travel.

11. Jacking and traversing apparatus for motor vehicles comprising means for bodily raising a vehicle substantially horizontally as a whole, means for moving a vehicle in directions at right angles to its normal path of travel, a closed system of fluid circulation in which said aforementioned means are arranged, supporting devices, individual piston assemblies operatively engaging said supporting devices, and said individual piston assemblies being arranged in the system of fluid circulation for automatic actuation upon the occasion of pressure in said system to move said supporting devices into engagement with the running gear of the vehicle for the purpose defined.

12. Jacking and traversing apparatus for motor vehicles comprising a system of fluid circulation, a power unit in said system and pivoted supporting devices, and independent actuating means, one for each supporting device, arranged in said system of fluid circulation, and adapted to be actuated upon development of pressure therein to move the supporting devices to engage and support the running gear of the vehicle when it has been jacked.

13. Jacking and traversing apparatus for motor vehicles comprising means for bodily raising a vehicle, means for laterally moving a vehicle, a system of fluid circulation in which each of said aforementioned means is operatively arranged, trip devices in said system of fluid distribution, and said trip devices adapted to be actuated upon development of pressure in the system to release the means for bodily raising a vehicle.

14. Jacking and traversing apparatus for motor vehicles comprising means for bodily raising a vehicle, means for laterally moving a vehicle, a system of fluid circulation in which each of said aforementioned means is operatively arranged valve means for controlling the means for bodily raising a vehicle, other valve devices for positively actuating said control valves, and master control devices for regulating the operation of said last mentioned valve devices.

15. Jacking and traversing apparatus for motor vehicles comprising means for bodily raising a vehicle, means for moving the vehicle in a lateral direction, said first mentioned means including each a piston assembly, a system of fluid circulation in which said means are arranged, valves for controlling the delivery of pressure to the piston devices, master valve control means operatively associated with the aforementioned valves, and trip devices carried adjacent said piston assemblies and adapted at certain times to engage the control valves to close the same and at other times to engage the master valve control means for the purpose defined.

16. Jacking and traversing apparatus for motor vehicles comprising a system of fluid circulation, a power unit in said system, a plurality of supporting devices for the running gear of the vehicle when in raised position, and relatively independent fluid pressure responsive devices, one for each supporting device and in positive connection therewith, also arranged in said system for actuating said supporting devices to engage the running gear upon development of pressure in the system.

17. The combination with jacking and traversing apparatus for mobile bodies, of means for supporting the running gear of said bodies when the bodies are in a raised position, relatively independent means, one engaging each of said supporting means, for moving the same to engage the running gear, a common automatic control element associated with said means and arranged to actuate the same to engage the running gear when such gear is in an elevated position, and automatic means independent of the aforementioned means for releasing said supporting devices from the running gear when the same are not in elevated position.

18. The combination with jacking and traversing apparatus for mobile bodies, of means for supporting the running gear of said bodies when the bodies are in a raised or jacked position, said means comprising individual pressure responsive devices arranged each for direct engagement with one of the supporting devices to move the same into engagement with the running gear, a common source of pressure supply for said pressure responsive devices, and automatic means for releasing said supporting devices upon reduction of pressure in said pressure responsive devices.

19. The combination with fluid actuated means for bodily raising a vehicle, of supporting devices for the running gear of said vehicle, said supporting devices being mounted for pivotal movement to engage and disengage said devices from the running gear of the vehicle, piston and cylinder assemblies carried adjacent to each of said supporting devices, and the said pistons having positive connection with said devices, and a system of fluid distribution communicating with each of the cylinders and with the fluid means for raising the vehicle whereby the pistons are actuated to engage the supporting devices with the running gear when pressure is increased in the fluid actuating mechanism.

In testimony whereof, I affix my signature hereunto.

VILLOR P. WILLIAMS.